Oct. 11, 1927.  H. NICHOLS  1,645,395
VEHICLE WHEEL
Filed May 21, 1923   2 Sheets-Sheet 1
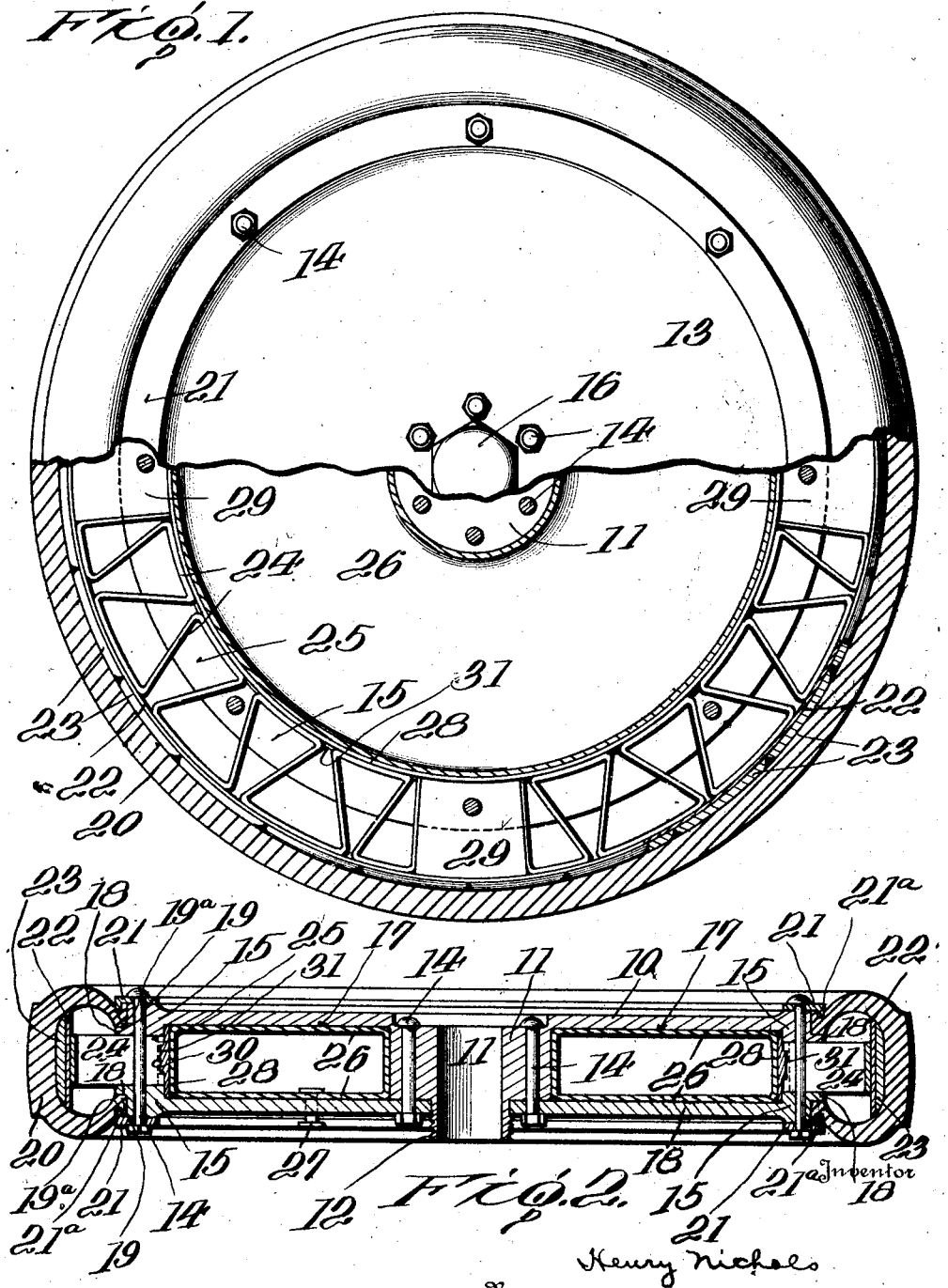

Oct. 11, 1927.  
H. NICHOLS  
1,645,395  
VEHICLE WHEEL  
Filed May 21, 1923 2 Sheets-Sheet 2
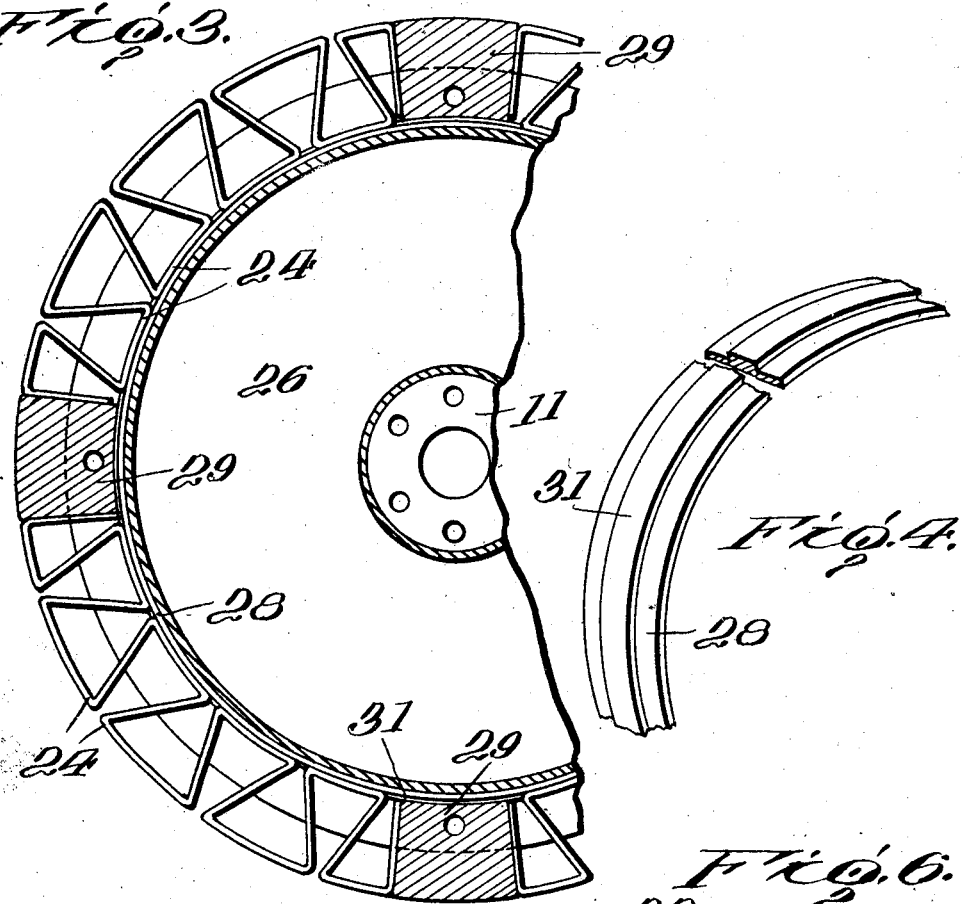
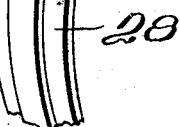
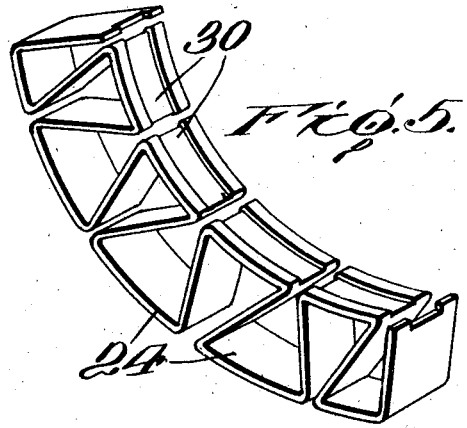
Inventor  
Henry Nichols  
By Wm. S. Hodges  
Attorney Patented Oct. 11, 1927.

1,645,395

UNITED STATES PATENT OFFICE.

HENRY NICHOLS, OF NEW YORK, N. Y.

VEHICLE WHEEL.

Application filed May 21, 1923. Serial No. 640,435.

This invention is a vehicle wheel of the type having means substituted for the standard pneumatic tire to absorb road and other shocks imparted to the wheel while in operation.

One of the objects of the invention is to provide a wheel of simple construction, which will have all of the beneficial advantages of a wheel equipped with the standard pneumatic tire, and yet not be subjected to the inconveniences which usually result from punctures and blow-outs. A further object is to provide a wheel formed of separable sections, having means whereby a shoe similar to that of a standard pneumatic tire may be secured thereto, and means within the shoe for transmitting the road shocks around the same, the construction being such that the shoe will not collapse if punctured, whereby it may be worn almost completely through without danger of failure to sustain the load. A further object is to provide a pneumatic cushion of maximum capacity for the tire, so positioned that it will not be exposed to wear or contact with the road bed, and means interposed between the same and the tire shoe to carry the road shocks around the wheel, whereby the weight of the load is stabilized and a perfect balancing of the cushioning functions is insured. A further object is to provide means to increase the resiliency at the tire shoe.

The invention will be hereinafter fully set forth and particularly pointed out in the claims.

In the accompanying drawing:—

Figure 1 is a side elevation partly in section illustrating a wheel constructed in accordance with the invention. Figure 2 is a transverse sectional view with the hub nut removed. Figure 3 is a vertical sectional view illustrating the arrangement of the convolute equalizing members. Figure 4 is a detail fragmentary view illustrating a portion of the equalizing spring which contacts with the pneumatic cushion. Figure 5 is a detail view illustrating a portion of the convolute spring. Figure 6 is a plan view illustrating the tread equalizing spring.

Referring to the drawing, 10 designates the main wheel body section, provided with a central enlargement forming a hub 11, from which extends an externally threaded boss 12. A supplemental disk-like body member 13, provided with a central opening complemental to the boss 12, co-operates with section 10, to form the wheel body, the two sections being clamped together by means of bolts 14, passed through coinciding openings in the rim portions 15, and also by means of a nut 16 working on the threaded boss 12. The hub 11 and the rim portions 15 are so shaped that when the two wheel sections are united, an annular chamber 17, of relatively large volume, is formed between the hub and the rim.

The peripheries of the rim portions 15 are provided with shoulders 18, produced by intersecting radial and transverse cylindrical surfaces, forming seats for the beads 19 of tire shoe 20 similar to the standard pneumatic tire shoe but somewhat different in shape. The tire is retained in place by means of clamping rings 21 pressed against the outer edges of the beads 19 and held in place by the bolts 14, said rings having flanges $21^a$ shaped to enter annular grooves $19^a$ in the beads 19, and of a length to overlap the cylindrical portions of the shoulders 18. Located within the shoe 20 is a band-like tread-equalizing spring 22, provided with segmental pad-like members 23, shaped to conform to the internal contour of the shoe. Bearing against the spring 22 is a convolute equalizing member 24, the convolutions of which extend from the spring 22 through a reduced annular opening 25 formed by complemental inwardly offset registering portions of the rims of the wheel sections 10 and 13. Located within the chamber 17 is an annular pneumatic cushion 26, which may be inflated in suitable manner through a valve 27, the stem of which extends through an opening in one of the wheel sections. Interposed between the convolute member 24 and the cushion 26, and encircling the periphery of the latter, is a band-like equalizing spring 28.

The convolute bearing member may be constructed of one continuous piece, but it is preferred to construct it in a plurality of sections, as illustrated in the drawing, the convolutions being of approximately equilateral shape in side view, so as to provide acute angled bends with maximum bearing surfaces against the equalizing rings 22 and 28. Each section terminates in a straight radially disposed portion, which bears against a spacer block 29, a plurality of said blocks being interposed between the sections 10 and 13, and serving as anchoring devices for the springs. The outer curved portions of the convolute members bear against the equalizing spring 22 and the inner curved portions of said members bear against the equalizing spring 28, the last mentioned spring resting upon the shoulders formed by the inwardly offset portions of the wheel members 10 and 13. For the purpose of preventing relative lateral play between the spring 28 and the respective convolute sections, each of the latter is provided with grooved portions 30, which interlock with a rib 31 formed on the spring 28.

In practice, the cushion 26 is inflated to the desired pressure, approximating the pressure of the standard pneumatic tire, through the valve 27 by means of any suitable inflating apparatus. When the wheel is without load the air pressure within the cushion 26, acting against the equalizing spring 28, will force the convolute equalizing members 24 outwardly in a radial direction, and thereby maintain the tire shoe in a distended condition, by reason of the pressure of said convolute equalizing member against the equalizing spring 22. When the wheel is under load, the spring 22 tends to force the convolute equalizing member 24 inwardly, and this pressure is equalized at the shoe 20 by means of the spring 22, in much the same manner as the standard pneumatic tire distributes the load. The acute angle bends of the equalizing members 24, serve to make said members more sensitive to the inward pressures and shocks, and to more equally and resiliently distribute the shocks around the wheel. At the same time the tire shoe is maintained in its properly distended condition. The inward pressure of the convolute equalizing members upon the spring 28, causes the latter to react against the pneumatic cushion, and to distribute the load around the same in a manner well understood in the art. At the same time the convolutions of the members 24 tend to also carry the strains around the wheel. Thus the pressure upon the spring 22 is carried through the sections of the member 24 and the spring 28, to the cushion 26, and said springs 22 and 28, and the sections of the convolute member 24 also react against each other, to carry the strains and shocks around the wheel.

From the foregoing it will be readily understood that a very simple and inexpensive wheel is provided, so constructed that the parts may be readily separated if desired for repairs and the like. To separate the sections, it is only necessary to remove the clamping rings 21 and the nut 16, and the parts are all released and ready to fall apart. A further advantage is that by placing the pneumatic cushion 26 between the wheel sections 10 and 13, so that it will not be exposed to direct contact with extraneous substances, all of the advantages of the standard pneumatic tire are obtained and yet the inconveniences which normally result from exposure to punctures and blowouts are avoided. Not only is this true, but the shoe may be worn almost completely through without danger of collapse because it is sustained by the convolute equalizing member and the annular equalizing springs between which it is interposed, and therefore any air leaks in the shoe can have no effect whatever upon the cushioning characteristics of the wheel. By means of the anchoring blocks 29 the sections of the convolute member are held in place, and said blocks at the same time prevent undue pressure upon the equalizing member, which otherwise would tend to cramp the movement of the latter when the sections 10 and 13 are clamped together, thereby insuring enough space between the wheel sections to permit the convolute member to have free radial reciprocation under the road shocks. By reason of the triangular shape of the convolutions, the road shocks are quickly absorbed and equalized around the entire wheel, and danger of breaking down is reduced to a minimum. By employing the tire-securing rings with flanges shaped to enter complemental grooves in the tire beads, a simple means is provided by which the tire is securely locked in position, but permitting ready removal thereof. No claim is made herein for the subject-matter described and claimed in Letters Patent 1,506,602, granted August 26, 1924.

Having thus explained the nature of the invention and described an operative manner of constructing and using the same, although without attempting to set forth all of the forms in which it may be made, or all of the forms of its use, what is claimed is:—

1. A wheel of the character described comprising a main body member, a disk-like supplemental body member, means separately uniting said body members, a pneumatic cushion located between said body members, a tire shoe, means retaining the tire shoe in position, and a convolute equalizing member interposed between said cushion and said shoe and reacting against both, all of the convolutions of said equalizing member being of approximately equilateral triangular shape in side view and having bearing portions concentric with and reacting against said penumatic cushion.

2. A wheel of the character described comprising a main body member, a disk-like supplemental body member, a pneumatic cushion located between said body members, a tire shoe, means cooperating with said body members to retain the tire shoe in position, a band-like equalizing spring encircling said cushion, and an equalizing member guided between the wheel members and interposed between said equalizing spring and said shoe, so as to react against both the shoe and the pneumatic cushion.

3. A wheel of the character described comprising a main body member, a disk-like supplemental body member, means separately uniting said body members a pneumatic cushion located between said body members, a tire shoe, means retaining the tire shoe in position, and a convolute equalizing member interposed between said cushion and said shoe and reacting against both, all of the convolutions of said equalizing member being of approximately triangular shape in side view and having bearing portions concentric with said pneumatic cushion, said convolute member being formed of separable sections, the extremities of said sections having anchoring portions.

4. A wheel of the character described comprising a main body member, a disk-like supplemental body member, a pneumatic cushion located between said body members, a tire shoe, means retaining the tire shoe in position, anchoring blocks interposed between the respective body members, and a convolute equalizing member guided between the wheel members and interposed between the cushion and said shoe, so as to react against both, said convolute member being formed of separable sections with all of the convolutions thereof of approximately equilateral triangular shape in side view, the extremities of said sections having radially extended anchoring portions positioned to engage said blocks.

5. A wheel of the character described comprising a main body member having a centrally disposed laterally extended boss, a disk-like supplemental body member having an opening complemental to said boss, said body members cooperating to provide a chamber surrounding said boss, a pneumatic cushion located within said chamber, a tire shoe engaging the peripheries of said body members, means cooperating with said body members for retaining said tire shoe in position, a band-like equalizing spring encircling said cushion, and a resilient equalizing member guided between the wheel members and interposed between said spring and said shoe, so as to react against both.

6. A wheel of the character described comprising a main body member having a centrally disposed laterally extended boss, a disk-like supplemental body member having an opening complemental to said boss, said body members cooperating to provide a chamber surrounding the boss, a pneumatic cushion located within said chamber, a tire shoe secured to the periphery of said body members, an equalizing member guided between the wheel members and interposed between said cushion and said shoe, so as to react against both, and a tread equalizing spring interposed between the equalizing member and the shoe and provided with segmental pads bearing against the inner surface of the tread portion of said shoe.

7. A wheel of the character described comprising a main body member having a centrally disposed laterally extended boss, a disk-like supplemental body member having an opening complemental to said boss, said body members having offset portions forming shoulders and cooperating to provide a chamber surrounding said boss, a pneumatic cushion located within said chamber, a tire shoe secured to the peripheries of said body members, a band-like equalizing member encircling said cushion and resting upon the shoulders of the body members, and an equalizing member guided between the body members and interposed between said spring and said shoe so as to react against both.

8. The combination with a wheel body formed of separable sections the peripheries of which are provided with intersecting radial plane and transverse cylindrical surfaces forming seats, a tire-shoe having beads provided with surfaces complemental to said seats, clamp rings for retaining said tire-shoe in position, said rings having inwardly offset engaging portions overlapping said seats, and means enclosed by said sections for maintaining said shoe in distended relation.

9. The combination with a wheel body formed of separable sections, the peripheries of which are provided with intersecting radial plane and transverse cylindrical surfaces forming seats, a tire shoe having beads provided with surfaces complemental to said seats, clamp rings for retaining said tire shoe in position, said rings having inwardly offset engaging portions overlapping said seats, and means enclosed by said body sections for maintaining said tire-shoe in distended relation, the width of said tire shoe being substantially greater than the depth thereof.

In testimony whereof I have hereunto set my hand.

HENRY NICHOLS.